United States Patent [19]

Snyder

[11] 4,113,397
[45] Sep. 12, 1978

[54] PINLESS RESILIENT COUPLING

[76] Inventor: Francis H. Snyder, Littlebrook Farm, Newtown, Conn. 06470

[21] Appl. No.: 668,542

[22] Filed: Mar. 19, 1976

Related U.S. Application Data

[63] Continuation-in-part of Ser. No. 623,513, Oct. 17, 1975.

[51] Int. Cl.² .............................................. F16B 21/18
[52] U.S. Cl. ...................................... 403/154; 85/8.8; 403/316; 403/326
[58] Field of Search ................ 85/5 N, 5 CP, 8.3, 8.8, 85/8.6; 403/154, 155, 157, 317, 316, 379, 326; 24/201 CP

[56] References Cited

U.S. PATENT DOCUMENTS

| 895,842 | 8/1908 | Chambers | 85/8.8 |
| 2,204,117 | 6/1940 | Brammer | 85/8.8 |
| 2,420,921 | 5/1947 | Waldes | 85/8.8 |
| 2,554,957 | 5/1951 | Riblet | 85/8.8 |
| 2,574,034 | 11/1951 | Heimann | 85/8.8 |
| 3,442,171 | 5/1967 | Engelmann | 85/8.8 |
| 3,595,123 | 7/1971 | Wurzel | 85/8.8 |

FOREIGN PATENT DOCUMENTS

| 2,427,615 | 11/1975 | Fed. Rep. of Germany | 85/8.8 |
| 125,335 | 6/1949 | Sweden | 85/8.8 |

Primary Examiner—Andrew V. Kundrat
Attorney, Agent, or Firm—David H. Semmes

[57] ABSTRACT

An improved resilient retainer which provides a highly reliable clamping action upon grooved clevis pins and the like. The pinless retainer configuration comprises two essential sections; a clamping section which is spring loaded to be secured around the core diameter of a grooved clevis pin together with an entry section which prevents the retainer from being removed easily. The retainer requires a grooved clevis pin and the like to be inserted past a first entry section and then snapped into the clamping section. The retainer may be formed from any resilient material and operates effectively with a minimum of insertion force without sacrifice of positive clamping effectiveness. In a second form the pinless retainer includes an encompassing guard clip for the entry section with removal from a grooved pin requiring a first removal of the associated guard clip.

18 Claims, 16 Drawing Figures

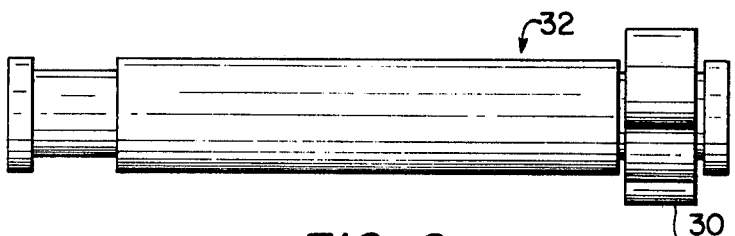 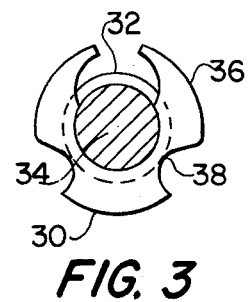
FIG. 2    FIG. 3
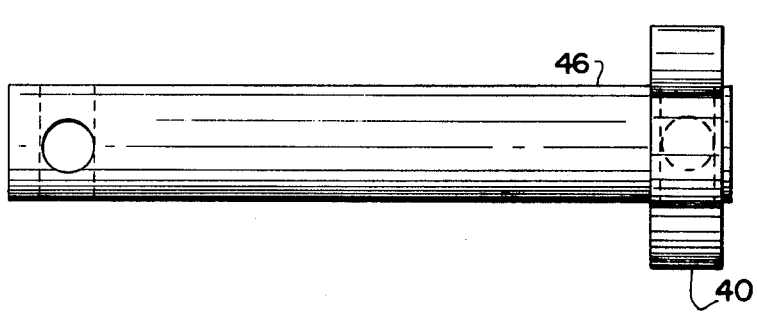 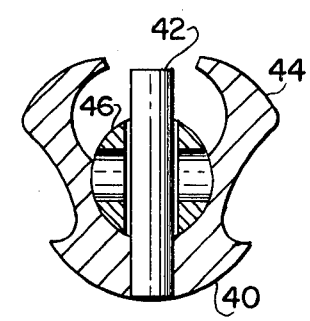
FIG. 4    FIG. 5
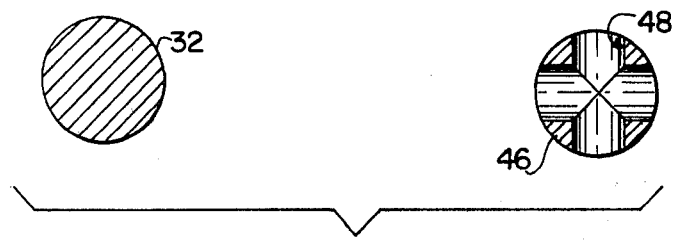
FIG. 6
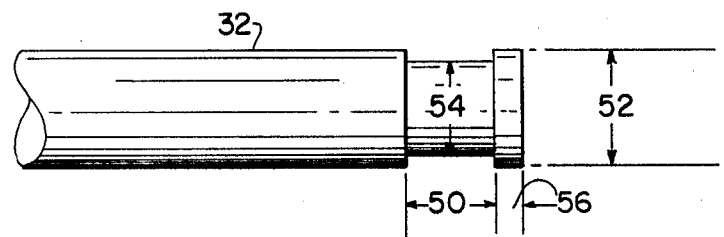
FIG. 7

PINLESS RESILIENT COUPLING

CROSS REFERENCE TO RELATED APPLICATIONS

This application is a continuation-in-part of my copending application entitled: RESILIENT COUPLING, filed Oct. 17, 1975, Ser. No. 623,513.

BACKGROUND OF THE INVENTION

1. Field of the Invention

Various and sundry applications exist for cotter pins, ring ends and other expedients for retaining rods or pins of clevises and shackles. The simple cotter pin and ringdings, (as split continuous ring assemblies are commonly known), are notoriously liable to fouling and accidental detachment.

There has existed a need for an effective and inexpensive retainer to replace cotter pins and the like which will be easily snapped on and off of a clevis and yet not be detached accidently. Additionally, it is important that a retainer in marine use, for example, not be so formed as to be easily lost or entangled in ropes or lines, nor caught or hooked on, or by, clothing or other possible external hazards. Clevis pins and other such rod-like members come in various sizes and there has existed a need for a retainer which will prevent lateral or end movement of a member on such a rod without the heretofore disadvantages of clumsiness in application and the ever present danger of fouling or accidental disengagement. According to this invention grooved clevis pins are necessarily used to cooperate with the pinless retainer to preclude lateral movement of the retainer along the clevis pin axis.

2. Description of the Prior Art

Previous attempts have been made to replace the simple cotter pin with a retainer means that easily snaps around the clevis, or other such rod, with a retaining pin to prevent the retainer from lateral movement.

In addition to the prior art noted in parent application Serial No. 623,513 which is incorporated by reference in the instant continuation-in-part application, the following additional patents exemplify previously known pinless retainers usuable with grooved clevis pins:

WURZEL U.S. Pat. No. 3,595,123
WORMSER U.S. Pat. No. 3,340,760
FEITL U.S. Pat. No. 2,491,306
ALSAKEN U.S. Pat. No. 1,915,640

Wurzel illustrates one form of pinless retainer which is predicted upon adjusting the geometry of a flexible section between two clamping jaws. Wurzel at FIG. 3 illustrates use of this retainer in combination with a grooved shaft analogous to the present pinless retainer teachings. However, Wurzel does not include double entry and clamping sections, relying simply on the distension of sharp corner points at A in order to effect a clamping within the groove G. Furthermore, there is no suggestion in Wurzel that a composite retainer can be formed through the combination of a double-entry pinless retainer and a septum guard clip, as is taught hereinafter.

Similarly, the references to Wormser, Feitl and Alsaken represent specified prior art retainers to the Wurzel teachings and are likewise merely illustrative of those spring retainers upon which the present invention predicates improvement.

SUMMARY OF THE INVENTION

The present invention teaches a resilient coupling device for engagement of clevis pins and the like which comprises in combination a resilient body member which includes a base portion and two extending legs extending therefrom. The inner surfaces of the base together with the legs define a concave clamping section which positively engages around the outer circumference of a clevis pin and the like at a lateral position on a grooved clevis allowing the double entry and clamping with an infinite number of angles for entry. The inner surfaces of the extending resilient legs further define an entry section which is operable to resiliently engage a clevis pin previous to its insertion into the clamping section. The entry section is formed by opposing projections between and proximate the distal end of the legs to thereby define a gate dimension through which the clevis pin must be initially inserted therepast. Between the distal ends and the base section on the inner surfaces of the resilient legs there is further provided a second set of opposing projections which defines a transition dimension between the entry and clamping sections which also must be resiliently urged apart for passage of a clevis pin into the clamping section.

In a preferred embodiment the transition dimension extending inwardly between the entry and clamping section further comprises sharp edge corners. The sharp edge corners may be defined by opposed first concave inner surfaces on the legs within the entry section and second concave innner surfaces on the legs within the clamping section. As is further taught herein, this transition dimension comprised by sharp corners may be further defined by the convex surfaces within the entry section by the intersection of opposed plane surfaces at the sharp corners. It has been found that when the sharp corners defined by the convex entry surface is a pair of opposed plane surfaces inclined to approximately 30° to the locus of the centerline of the retaining pin a further facilitation of entry of the clevis pin into the clamping section is accomplished.

The force required to engage the retainer of the instant invention over a clevis pin and the like is dependent upon certain geometry of the base and leg structure. The extending clevis may be shaped, as is taught hereinafter, so that a reduced wall thickness of each of the legs between the transition dimension and the base effectively controls the force required for application.

Alternatively, the bendable section of the retainer may be comprised by a single spring section defined by the incorporation of reduced thickness section as part of the base. In certain embodiments utilizing this single spring section there advantageously includes the definition of a hole which allows for the passage of a plug or equivalent auxiliary mounting structure.

The present invention is further illustrated by the combination of a pinless retainer and a septum guard clip. The septum of such a guard clip adds a redundant positioning surface in addition to the resilient clamping obtained by the clamping section geometry alone.

Moreover, other features, objects and advantages of this invention will become apparent by reference to the following detailed description and drawings.

BRIEF DESCRIPTION OF THE DRAWINGS

FIGS. 2 and 3 show an application of a pinless retainer;

FIGS. 4 and 5 show a comparative application of a pinned retainer as taught by the parent case;

FIG. 6 represents another comparison between pinless and pinned retainers;

FIG. 7 represents a wide-grooved clevis pin usable with the present invention;

DESCRIPTION OF THE PREFERRED EMBODIMENTS

Figure 1:
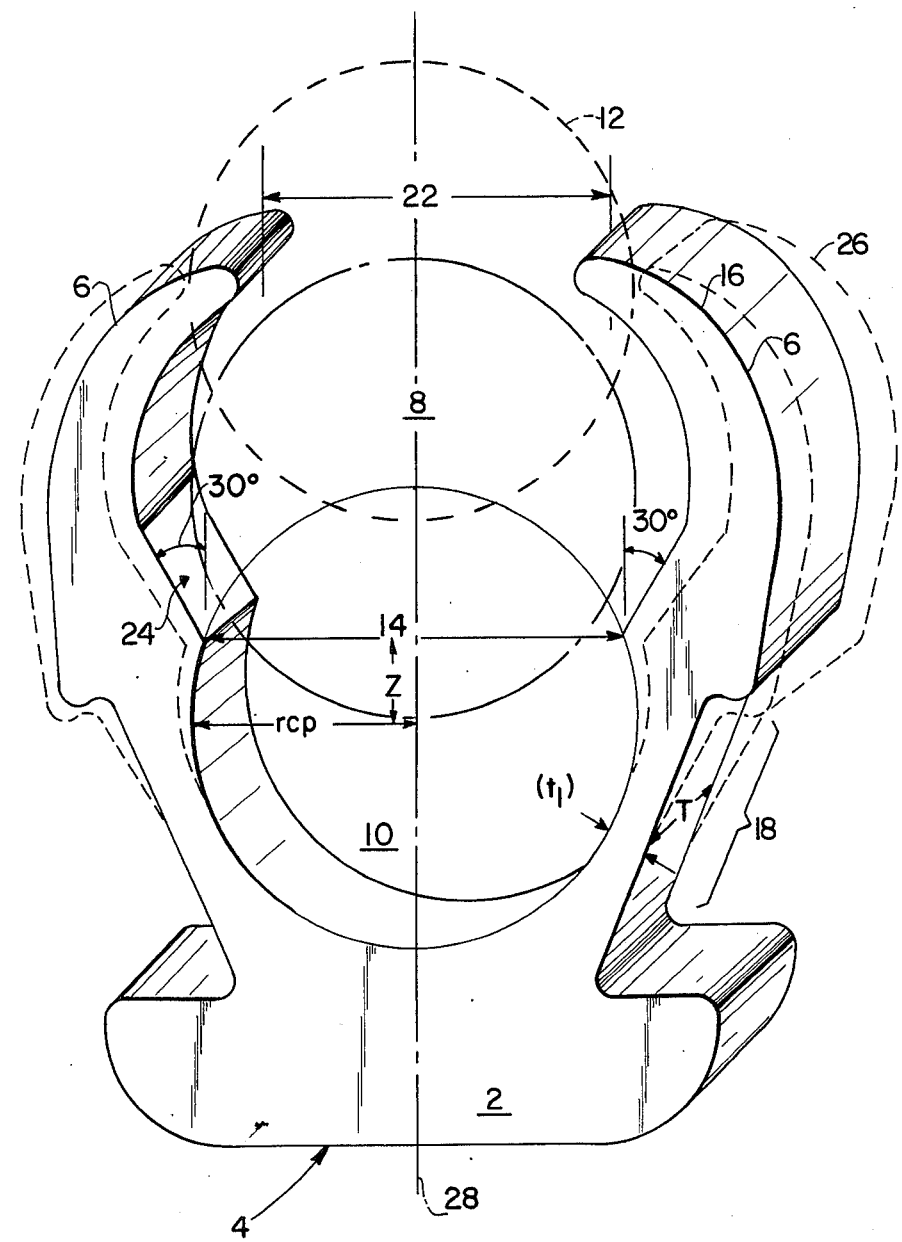
FIG. 1 schematically illustrates the operation of a retainer according to the basic principles of the instant invention.

Referring now to the drawings, FIG. 1 represents the basic principle of a pinless retainer and is useful for an initial consideration of the dynamics involved. The resilient member 2 is formed of various materials, including synthetic resins and plastics or from metals and other such materials that have high moduli of elasticity. The resilient member 2 comprises a base 4 with a pair of extending legs; both labeled 6 due to their total symmetry about the centerline of the device. The inner surfaces of the extending legs confine a clamping section generally indicated at 10 and an entry section generally indicated at 8. The centerline of the device is also along any one diameter of the grooved section of a clevis, and is shown as 28. The legs 6 further include, in a preferred embodiment, rounded outer surfaces 16 which extend from the distal ends. The entry section 8 is essentially defined by a gate dimension 22 and a transition dimension at 14. As shown in phantom representation in FIG. 1, the passage of the clevis pin in position 12 through entry gate 22 can only be accomplished by flexing the resilient legs 6 outward to the phantom position identified as 26.

The convex inner surfaces of the legs 6 defining the entry section are illustrated to define sharp corners at the transition dimension at 14 through the intersection of opposed plane surfaces at the sharp corners. As illustrated in FIG. 1 these plane surfaces are shown inclined approximately thirty degrees to the locus of the centerline of a retaining pin 28. As further illustrated on the drawing the sharp corners are located a dimension Z above the centerline of the final rest position on a grooved pin, the radius of such a pin being indicated as $R_{CP}$. This dimension Z bears a particular relationship to the effective clamping action of the device as will be more particularly explained. In a flexing of the extending legs from the position at 6 to expanded position 26, the dimensions $t_1$, Z and T of FIG. 1 alone control the work required. Stiffness increases linearly with T and exponentially (exponent about 1.6) for increased $t_1$. As illustrated in FIG. 1, there is a particular wall thickness $t_1$ which is shown as perpendicular to a surface of revolution which includes the partial surface of revolution which defines the clamping section 10. Therefore with Z constant the relationship between wall thickness $t_1$ together with the thickness T of the retainer body may be adjusted to control the dynamic forces required for application of the retainer over a clevis and the like.

As can be noted from inspection of the rest and expanded positions of the leg 6, from 6 to position 26, all the displacement of the gate and the sharp corners occurs above the dimension $t_1$. Since $t_1$ is the thinnest section of the extending legs it becomes the point of bending and does not transmit an effective bending moment to the thicker base section 4. The left-hand arrow at the inner surface of the clamping section, proximate the dimension $t_1$, is the center of motion for the flexure, and below $t_1$ there is no relative motion of the retainer in operation.

It has been found impossible to detach the retainer from its clamping position as shown in FIG. 1 by simply attempting to move only one of the extending legs 6 from its clamping position to its expanded position as shown at phantom at 26. The harder one would push on only one extended leg, the tighter the other side will get. The sides have to be spread apart equally, or nearly equally. Force applied to one side merely rotates the retainer.

It has been found that the clamping section 10 will securely hold a clevis pin and the like having an outer diameter substantially congruent to the radius of revolution of the clamping section. The radius $R_{CP}$ indicates the radius of revolution of the clamping section. The axis of the surface of revolution defining the clamping section is perpendicular to the locus 28 for the centerline of the device, as shown in FIG. 1. The clamping surface of revolution terminates as a sharp corner to define a transition dimension 14 whereby the clamping section will resiliently engage somewhat more than 180° of the circumference of the clevis pin. While the clamping section is shown as fairly congruent to the outer diameter of the clevis pin, the actual shape of this clamping section surface 10 need not engage the clevis pin around the entire circumference but only be such a surface that the dimension 14 is less than the core diameter of the grooved pin to be held.

The entry section 8 is shown as a concave surface having an oblate shape, and within the entry section a pin will be retained against accidental dislodgement by contact between the gate dimension 22 and the transition or sharp corners at 14. The receptacle cavity defined at the entry section 8 may be approximately circular and about 15 to 20 percent wider than the diameter of the pin to be retained, i.e. the core diameter of a grooved clevis pin. The gate dimension 22 may be between 87 to 93 percent of the core diameter which is to be retained. Therefore, the cavity defining the entry section prevents the clevis pin from being too easily removed after having been disengaged from the clamping section 10. Again with reference to FIG. 1 it can be seen that the effective surface area of a retained clevis pin that is actually and positively retained or gripped is that cylindrical segment that lies between the centerline of the pin and the sharp corners; the arc responding to the chord dimension indicated as Z. Again with reference to the radius of the clevis pin or the like to be retained the distance Z has been found to be effective when Z equals 30 to 40 percent of the radius, $R_{CP}$. The dimension 14 which is the width of the transition dimension has been found to be most effective between 87 and 93 percent of the diameter of the pin to be retained.

Even if the dimension 22 defining the gate width is on the order of 93 percent, after the clevis pin has been snapped from the clamping section into the entry section there will be much less force required to separate both the extending legs due to the increased distance of the dimension 22 above the bending point defined by the dimension $t_1$.

In operation, when the clevis pin is declamped from the clamping section 10 through the application of a force colinear with the centerline 28 upon the distal ends of the extended leg 6 the clevis pin actually jumps into the entry section 8. Passage of the core diameter past the transition dimension, in either direction, is accompanied by an audible click.

The clevis pin then located within entry section 8 can be more easily removed due to the reduced opposed force required to open the dimension 22 sufficiently to allow the pin to be removed. Because the clamped pin will not jump clearly out of the retainer device, there is no danger that the declamping operation will result in either loss of the pin or the retainer. The resilient member 2 is preferably made of any of various resins and plastics, such as unfilled polycarbonates (e.g. the trademarked product LEXAN). A number of other synthetic resins and plastics are also suitable, such as Nylon, Delrin and those plastics known as polysulfones. The only requirements of any material to comprise the body member 2 are that it have a moderately high elastic modulus and a very high modulus of rupture and impact resistance. The body 2 may be therefore made of such metals as clock spring strip. The preferred practice to manufacture the body 2 is through extrusion of a shape as shown with the dimension of extrusion being parallel to the axis of the surface of revolution of the clamping section. As a result the dimension of any particular device manufactured can be controlled by slicing it off to the dimension T.

While FIG. 1 illustrates the general embodiment of the principles of this application, as such FIG. 1 represents a large part of common subject matter as in the underlying teachings of the parent application, Ser. No. 532,513. However, the present invention is specific to pinless resilient retainers and in this respect the relationship between the pinless retainer and the standard retainer as representative in the parent application, will be manifestly understood.

FIG. 2 illustrates, in side view, a pinless retainer 30 in position upon a grooved clevis pin having an outer dimension illustrated at 32. It should be noted that the groove in the clevis pin is on the same order of magnitude as the dimension T hereinbefore defined with respect to the overall concept with reference to FIG. 1. The pinless retainer 30 is shown at FIG. 3 to be positioned within its clamping section around the core diameter defined by the groove in the clevis pin. This core diameter 34 is then a solid section allowing the retainer 30 to be placed into engagement onto the groove or core diameter with any approach angle.

In distinction, FIG. 4 shows an application of a standard retainer as is taught in the parent application, where a clevis pin 46 is of uniform diameter and provided with diametrical holes for accepting a retaining pin as shown at 42. Because the pinned retainer of FIG. 5 requires alignment of the retaining pin 42, the number of approach angles is limited by the orientation of the diametrical holes 48, as shown in FIG. 6. FIG. 6 therefore illustrates that with a pinless retainer the number of approach angles is infinite upon the groove core diameter 34, while with respect to a pin configuration the number of approach angles is limited by the number of retaining pin holes; which as shown is 4. With respect to FIGS. 3 and 5, the pinless retainer includes an extendable distal leg 36 with the amount of flexure required to distend the retainer being controlled by the geometry of the undercut which defines a flexure dimension at 38. In this respect the distal end of the standard pin retainer also includes a similar geometry as identified at 44 in FIG. 5. It should be noted that FIG. 3 illustrates an annual bearing surface being defined between the outer diameter of the clevis at 32 and the core diameter of the groove 24. FIG. 3, therefore, show in phantom the available contact area to resist thrust loadings from one embodiment according to the present pinless retainer invention. FIG. 7 illustrates a clevis pin of the type operable with the pinless retainers as taught herein. The clevis pin 32 has an outer diameter and a relatively wide groove, illustrated at one end but not limited thereto. The width of the groove 50 is determined by the associated thickness T of the retainer to be applied therewithin. For example, the outer diameter 52 of the clevis pin may be ¼ inch and the core diameter on the order of 3/16 inch. As shown, the width of the groove 50 is of the same order of magnitude as the core diameter 54. The groove 50 may advantageously be proximate, or spaced from, one end of the clevis pin by the dimension 56 in FIG. 7, which may be on the order of 1/16 of an inch. A pinless retainer so positioned in a groove allows for shear resistance by the entire retainer volume which is located within that annulus defined by the core diameter and the outer diameter.

Figure 8:
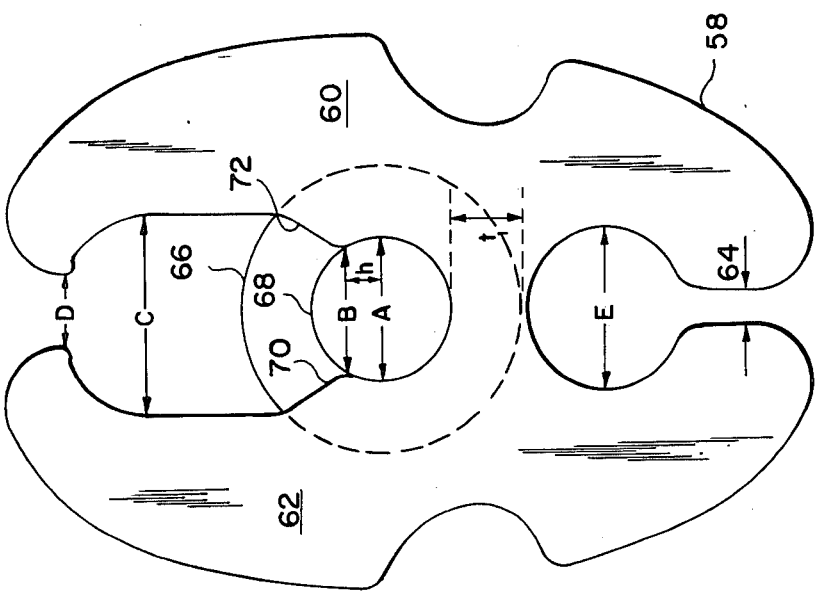
FIG. 8 represents a first embodiment.

FIG. 8 represents a first structural embodiment of a retainer according to the invention. A profile of this first embodiment is approximately elliptical with the sides of the device actually being comprised of circular segments. In this first embodiment, there is a grooved or core diameter 68 of a clevis pin and the like with the outer diameter of this pin illustrated at 66. This first embodiment is characterized by having a single spring section defined by the dimension $t_1$, which is immediately below the clamping section as shown with a dimension A. This single spring embodiment does not depend upon the flexure of two thin wall sections between the right leg 60 and the left leg 62 and base section, but rather employs only the minimum dimension $t_1$. This first embodiment of FIG. 8 is illustrated with a gate dimension D which prevents the unwitting release of the pin upon the acceleration of the core diameter 68 from the clamping section A. The dimension C is not critical provided it is equal to or larger than the clamping dimension A. The significant dimensions of this embodiment are consistent with the principles of the parent case, as described previously. For illustrative purposes, if the clamping dimension A is considered unity, the dimension B would be approximately 0.88A and the dimension h would be approximately 0.24A. For this embodiment to be consistent with the theory of operation as described, the spring section $t_1$ would be the thinnest section as shown in the front view of FIG. 8. According to this embodiment, the dimension $t_1$ would be both approximately 0.5A and also ¼ of the width of any other dimension along either legs 60 or 62. As shown in FIG. 8 the flexure of the legs 60 and 62 about the section $t_1$ is limited by the width of the bottommost spacing between the legs, identified as dimension 64. A further advantageous feature of this first embodiment is the incorporation of a separate mounting hole shown with a diameter E, for a utility as will be hereinafter described. The dimension 64 allows for the distal ends of the legs 60 and 62 to be sufficiently spread apart to allow the core diameter 68 to pass, sequentially, the clamping dimension B and finally the gate dimension D.

Figure 9:
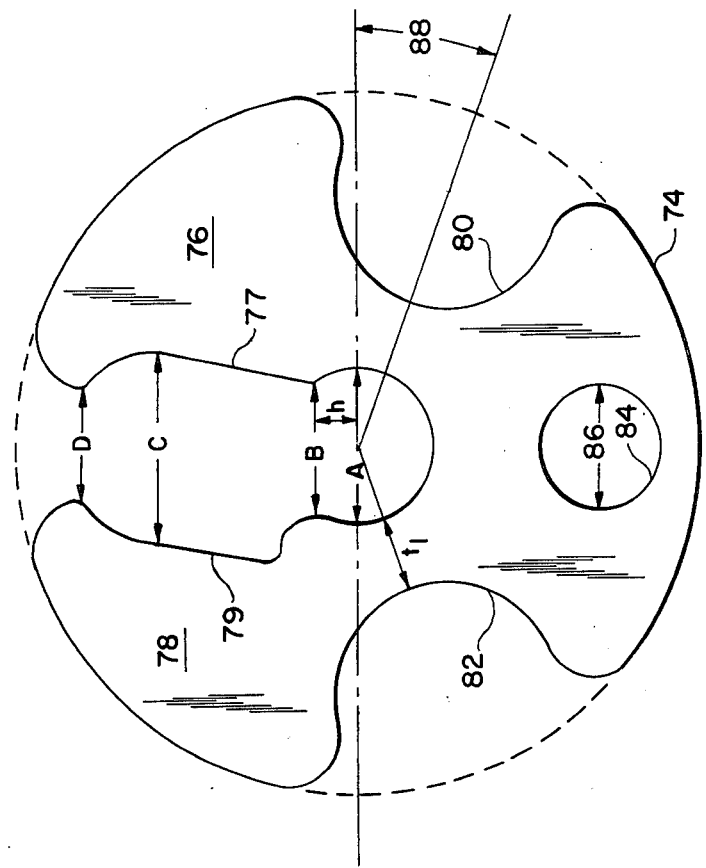
FIG. 9 represents a second embodiment.

The transition dimension B is further shown to be defined by an inwardmost projection 70 adjacent a ramp from the entry section to this transition dimension as shown at 72. As hereinbefore stated, the particular geometry given to the transitions between the entry section C and the clamping section A is not as critical as the relative relationships between the dimensions A, B, and h. With this embodiment as shown in FIG. 8 the other critical dimension is the dimension $t_1$ which would be on the order of 0.5A. The external mounting hole E allows for the separate inclusion of a mating plug so that the dimension 64 at the bottom of the leg 60 and 62 remains constant, i.e., the pin may not be removed while the plug is in place in hole E. A second embodiment of a pinless retainer according to this invention is shown at FIG. 9. Again, the relative dimensions which critically control the resilient clamping of a core diameter on a grooved clevis pin may be referenced to the clamping diameter A, as shown with the designation A. The transition dimension B is preferably approximately 0.86A in this embodiment with the gate dimension D effective if 0.64A. In this embodiment there are two flexure sections between the legs 76 and 78 with the representative dimension as shown again as $t_1$. Again, in this embodiment a flexure section $t_1$ has been found effective when it is approximately 0.5A. As in the first embodiment of FIG. 8, this second embodiment of FIG. 9 effectively clamps the core diameter of a grooved clevis pin where the dimension h is referenced as 0.24A. In this second embodiment the pinless retainer 74 essentially comprises a round outer configuration. The right arm 76 is illustrated with a smooth entry section ramp 77 and the left arm section further illustrated with an optional undercut entry ramp designated 79. This circular pinless retainer is configured to define the flexure dimension $t_1$ through the provision of a right circular undercut 80 and a left circular undercut 82. Also shown in the second embodiment is a provision for an external mounting hole 84 which may be of particular utility in an application illustrated subsequently in FIGS. 10 and 11. The width of external mounting hole 86 is not critical to the flexure of the instant retainer and may be of any convenient size for purposes as hereinafter described. As shown in FIG. 9 the right undercut may effectively be defined by a circular section where the centerline of the circular undercut is displaced an angle 88 below the centerline of the clamping section A. It has been found that an effective flexure dimension $t_1$ can be defined if the right circular undercut is made with the angle 88 being approximately 28°. Furthermore, in this preferred embodiment of FIG. 9, given an overall circular configuration with a diameter on the order of 9/16 of an inch, a flexure section of 0.062 inches will be defined if the circular undercut 80 is positioned on a centerline where the angle 88 is 20° and the diameter of the undercut 80 is 0.1875 inches.

Figure 10:
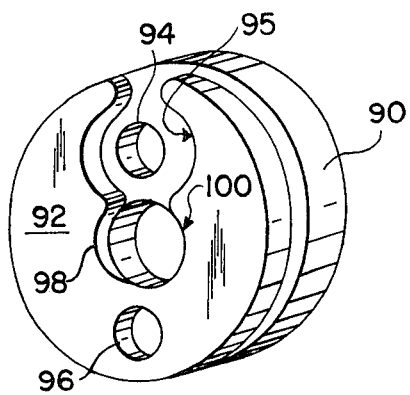
FIGS. 10 and 11 illustrate an application of the second embodiment.
Figure 11:
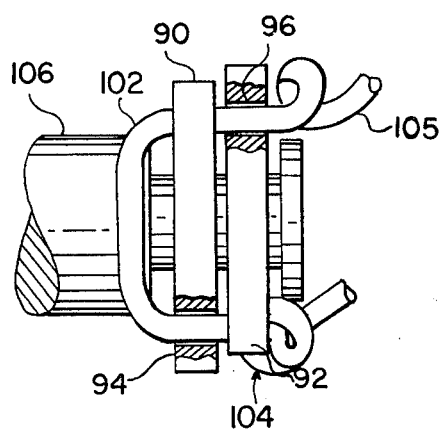

FIGS. 10 and 11 illustrate how two retainers according to the second embodiment of FIG. 9 may be paired in a particularly efficient fashion. FIG. 10 shows a first retainer 90 side by side with a second similarly configured retainer 92. As shown, the first retainer's mounting hole 94 is diametrically opposite the second retainer's mounting hole 96, with entry section 95 adjacent the first retainer's mounting hole 94. Because of the circular configuraton of the embodiment of FIG. 9 the clamping section 98 of the first retainer will be coincident with the clamping section 100 of the second retainer.

With reference to FIG. 11 it can be seen that the two retainers 90 and 92 may be snapped within a grooved clevis pin 106 so that a rope 102 may be inserted as shown. For example, by knotting the rope 102 as at 104 a pair of pinless retainers according to the second embodiment will be so joined together that neither can be removed without removal of the rope 102. Looking at the outer end of the attached assembly of FIG. 11, we see one of the pair in plan view, a rope 102 and a small knot 104 (simple overhand) on one end. The rope is shown with both ends outward from the end of the grooved clevis 106. When and as the pair is attached in the groove it is absolutely necessary that the knot 104 and free end 105 both extend outward. Then, when the rope 102 is drawn out so as to leave the appropriate knot 104 in the entry 95 of the outer unit 92, leaving the other end, 105, dangling, or it can be wound around between the cheek of the clevis and the retainer. In this position, the pair cannot be detached by pulling on the free end 105. However, when the knot 104 that is in the entry 95 is pulled out, and that end, 104, is given a yank, free end 105 is pulled through so that the entire assembly is detached in one motion; the rope and the pair of pinless retainers constitute a permanent assembly.

When such a knot 104 is in the entry 95 of the outer member of the pair, a pull on the free end of the rope, 105, acts exclusively on the inner member, 90. Since end 105 is then being pulled against the clevis pin, nothing can move, because the end being pulled is in the hole 96 of the outer retainer 92; if it were not there, the assembly would rotate and the inner member would come off.

What we have in FIG. 11, then, is a perfect circle or wheel, locked in a groove, but free to rotate. The rope has two functions: It forbids relative rotation of the members so that the gates cannot come into coincidence, and it makes the whole thing easy to manipulate and keeps the parts together.

It should be noted that retainers 90 and 92 in FIG. 11 may be made by simple punching out of plastic sheet, about 1/16 inch thick for the small sizes. It is only necessary that such a plastic be a high-impact polypropylene or high density polyethylene or other relatively flexible material. In FIG. 11 the combination depends less on clamping force since they are immune to accidental detachment. There is no need for a particular spring section, $t_1$; the entire body may deform enough. Once attached, with the rope in place, the clamping effect is secondary. Some types of polyolefins are very brittle at low temperatures; this is why the high-impact and high-density types are preferred for FIG. 11; these have satisfactory properties down to −30° to −40° F.

Figure 12:
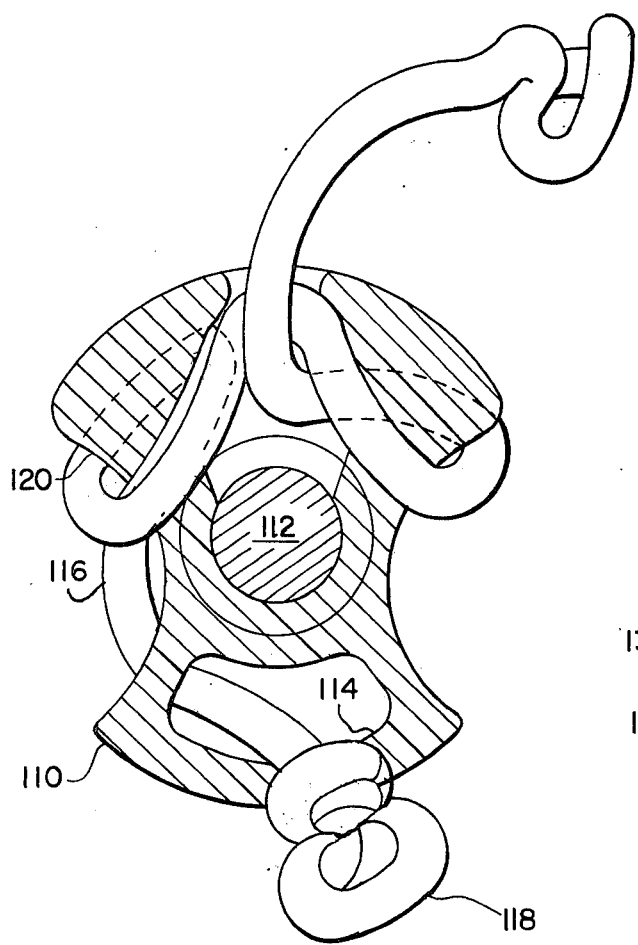
FIG. 12 illustrates another application of the second embodiment.

Another application of particularly secure application of the pinless retainers taught herein is shown in FIG. 12. The mounting configuration shown at 12 again is a slightly modified representation of a pinless retainer according to the second embodiment of FIG. 9. In FIG. 12 a double spring type of pinless retainer 110 is positioned around the core diameter of a clevis pin, 112.

The mounting hole, or slot, 114 will secure one end of line 116 if provided with a knot 118. As shown, the relatively thick line 116 may be wrapped around either distal end of the legs of the retainer and, as shown, the line will substantially occupy the entry section and also not slip off the distal ends of these legs due to its engagements in the vicinity of the undercuts at 120. In order to detach the line from this application, a loop on the right leg would be loosened to slip up and around the undercut 120 and thereafter the lines may be simply unwound around the distal end of the left leg. This particular typing arrangement illustrates the broad usability of a retainer configuration as taught herein, and such an application illustrates another form of redundancy of a pinless retainer on a grooved clevis pin. FIG. 12 would be particularly attractive for purposes where an absolute security against any form of displacement of the grooved diameter 112 is indicated.

Figure 13:
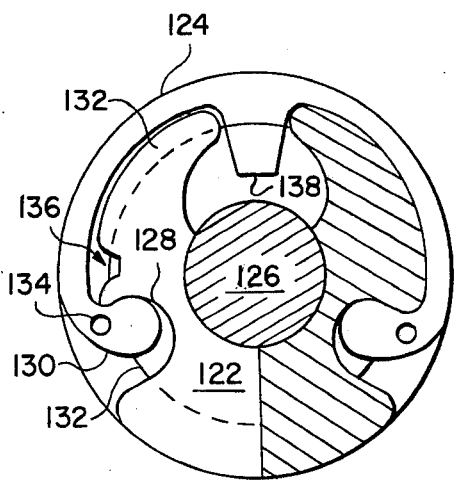
FIG. 13 illustrates a third embodiment.

FIG. 13 illustrates a third embodiment of the invention taught herein where a redundant septum and guard clip 124 is in combination with a pinless retainer 122. The guard clip 124 includes a wedge or septum 138 which extends inwardly approximate the core diameter of a grooved clevis pin, shown at 126. The guard clip 124 further includes at its respective distal ends 130 an external profile to extend within the undercut 128 of the retainer 122. As shown at FIG. 13, a pointed spike may be inserted into a relief space 136 provided for on either or both outer surfaces of the retainer body 122. Additionally, the guard clip 124 is illustrated with an alternative tool access opening 134 for facilitating flexure and removal of the guard clip from the main retainer body. It should be noted that the undercut 128 of the retainer body is sufficient to allow a simple holding of the guard clip. Of course, retainer 122 has independent utility even without the provision of the superposed guard clip 124. As shown, the grooved clevis pin may have an outer diameter 132 which will define an annular bearing area on the main retainer 122, as well as on the septum 138 and the distal ends 130 of the retainer clip. Therefore, the guard clip itself will not be subject to displacement axially along the clevis pin but must be removed by a flexure radially outward from the centerline of the clevis pin. It is interesting to note that the redundant use of a guard clip will accentuate the clamping force of the retainer and, therefore, further obviate any rattling of the assembly if used in a vibrating atmosphere. A further, synergistic, benefit of using the redundant guard clip is the minimization of any possiblity of a line being fouled within the entry section of the retainer if used alone.

Figure 14:
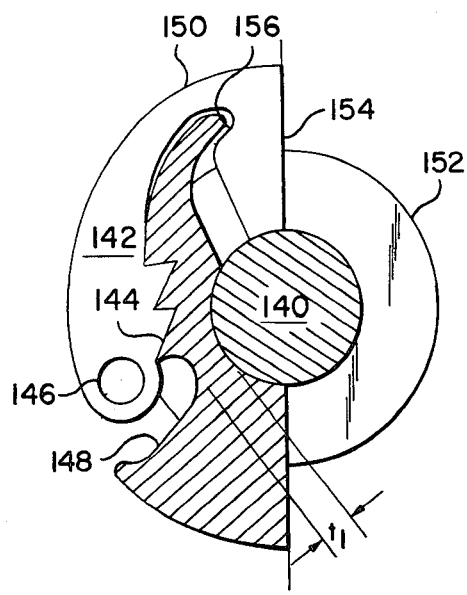
FIG. 14 illustrates a fourth embodiment.

FIG. 14 shows a half-sectional view of a symmetrical guard clip on combination with a pinless retainer. The core diameter of a grooved clevis pin, at 140, is shown to be adjacent the inner end of the septum 154. The guard clip 142 is shown with a minimum dimension 150 to provide for a point of flexure for the guard clip. Additionally, the guard clip 142 includes a series of saw-teeth surfaces, such as shown at 144, to further preclude any accidental disengagement of the guard clip. The guard clip 142 is further configured at 156 with a shoulder, therefore, even when the attachment hole 146 is spread outwardly, through flexure about the point 150, a secondary condition to removal of the guard clip is the passage of the shoulder 156 past the gate dimension on the distal ends of the legs of the retainer body itself. A retainer clip 148 according to this fourth embodiment similarly benefits from an annular bearing surface which is defined between the core diameter 140 and the outer diameter 152 of the associated grooved clevis pin.

Figure 15:
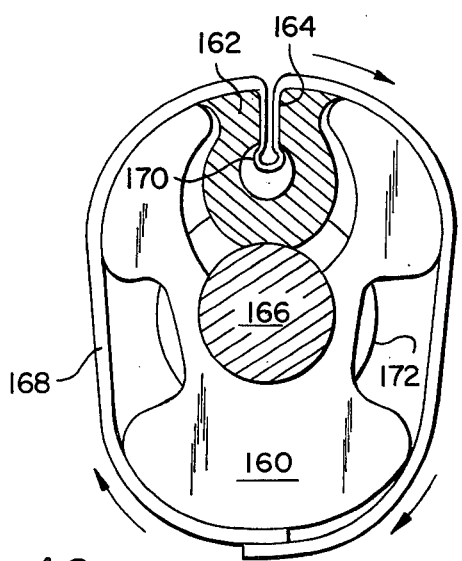
FIG. 15 illustrates a fifth embodiment.

FIG. 15 illustrates a fifth embodiment of a pinless retainer in combination with a type of septum guard. The retainer 160 may represent any form of pinless retainer according to this invention. As shown, septum unit 162 is maintained within the entry section of the retainer, proximate the core diameter 166, through the provision of an external wrapping of tape 168. As shown, the tape 168 may be doubled over and inserted into a split within the septum unit 162. As shown, the tape is doubled over at 170 and will reside within a circular opening below the split 164 defined in the septum 162. The tape 168 may be wrapped any number of times around the outer circumference of the assembly, as shown.

Figure 16:
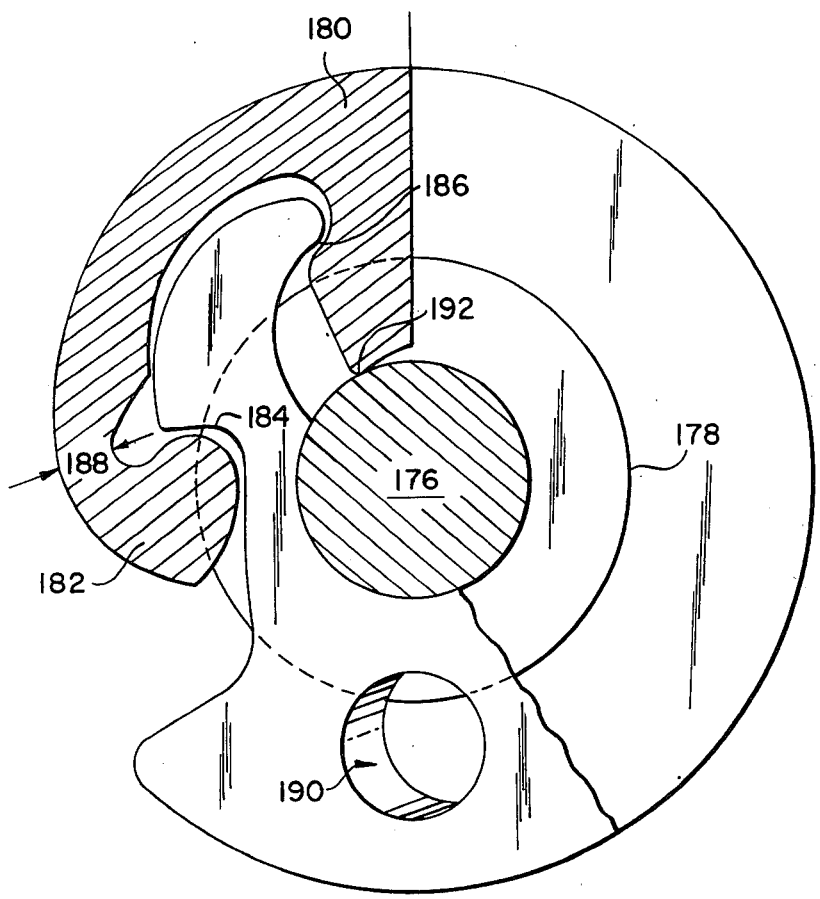
FIG. 16 illustrates a sixth embodiment.

A sixth embodiment of a pinless retainer is, by sectional view, illustrated in FIG. 16. The core diameter of a grooved clevis pin is designated 176 and the outer diameter of the pin is shown at 178. In this sixth embodiment a guard 180 is provided with a distal end 182 which includes a reduced thickness 188 proximate thereto. In this embodiment the removal of clip 180 may be accomplished by inserting a spike inside the dimension 188 and applying a radially outward movement from the centerline of the device. The septum guard further includes the secondary feature of a shoulder at 186 which will further require a distension of the distal end of the retainer leg for ultimate removal. It should be noted that the pinless retainer of FIG. 16 is shown with a flat undercut 184 which is allowed by the shape of the distal end of the retainer clip 182. As explained in reference to FIGS. 10 and 11, this sixth embodiment is similarly usable for a mounting as shown therein. The septum in this embodiment is illustrated at 192 to make a point contact with the outer diameter of the clevis core diameter 176 because it has been found that only such a minimal contact is necessary to preclude any rattling of the assembly of a pinless retainer and a guard clip.

While various embodiments of this invention has been as shown and described, this applicant intends to be limited solely by the invention as defined by the appended claims.

I claim:

1. A resilient coupling device operable for engagement with grooved clevis pins and the like, said pins comprising an outer diameter and a core diameter defined by said groove, and comprising in combination:

(A) a resilient member having a base and two extending legs, wherein the inner surfaces of said base and said legs define a partial circular clamping section operable to resiliently engage partially around a core diameter of a grooved clevis pin and the like; wherein, (B) said legs further define an entry section operable to resiliently engage said core diameter against dislodgement from between said legs, when said diameter is inserted therein, said entry section being defined by first opposing projections, between and proximate the distal ends of said legs thereby to define a gate dimension; and (C) second opposing projections on said inner surfaces of said legs to define a transition dimension between said entry and clamping section; both of said dimensions being less than said core diameter so as to resiliently maintain said core diameter against dislodgement; wherein (D) said base and said two extending legs define an annular bearing surface operable for engagement against the annulus defined between the outer and the core diameter of said grooved pin, wherein said base further includes a symmetrically placed single spring dimension below said clamping section, said single spring dimension defining the single minimum wall thickness of said device.

2. A resilient coupling as in claim 1 wherein the transition dimension between said entry and clamping sections further comprises sharp edge corners defined by opposed first concave inner surfaces on said legs within said entry section and second concave inner surfaces on said legs within said clamping section.

3. A resilient coupling as in claim 1 wherein said circular clamping section comprises a partial surface of revolution with an axis symmetrically between said two extending legs, said clamping section partial surface of revolution terminating as a sharp corner to define each of second opposing projections, thereby defining said transition dimension, said axis of revolution additionally being spaced between said transition dimension and said base whereby a grooved pin with a core diameter substantially congruent to the radius of revolution of said clamping section will be resiliently clamped around more than 180° of its circumference and held from longitudinal movement along said axis of revolution by the annular surface defined between said core diameter and said outer diameter.

4. A resilient coupling as in claim 3 wherein said transition dimension is approximately 0.8 times the diameter of said circular clamping section, and said transition dimension is spaced a dimension $h$ above the centerpoint of said clamping section, wherein $h$ is approximately 0.24 times the diameter of said clamping section.

5. A resilient coupling as in claim 1 wherein said single spring dimension is further defined, at its top, by the bottommost surface of said circular clamping section and said single spring dimension is further defined, at its bottom, by the top surface of a mounting hole, wherein said mounting hole further extends to the bottom of said base through a symmetrical open dimension in said base.

6. A resilient coupling as in claim 5 wherein said single spring dimension is approximately 0.5 times the diameter of said circular clamping section.

7. A resilient coupling as in claim 6 wherein said transition dimension is approximately 0.8 times the diameter of said circular clamping section, and said transition dimension is spaced a dimension $h$ above the centerpoint of said clamping section, wherein $h$ is approximately 0.24 times the diameter of said clamping section.

8. The combination of a resilient coupling device operable for engagement with grooved clevis pins and the like, said pins comprising an outer diameter and a core diameter defined by said groove, together with a guard clip, the combination comprising:

(A) a resilient member having a base and two extending legs, wherein the inner surfaces of said base and said legs define a partial circular clamping section for resiliently engaging partially around a core diameter of a grooved clevis pin and the like; wherein;

(B) said legs further define an entry section also operable to resiliently engage said core diameter against dislodgement from between said legs, said entry section being defined by first opposing projections, between and proximate the distal ends of said legs thereby to define a gate dimension; and, (C) second opposing projections on said inner surfaces of said legs to define a transition dimension between said entry and clamping sections; both of said dimensions being less than said core diameter so as to resiliently maintain said core diameter against dislodgement; wherein, (D) said base and said two extending legs define an annular bearing surface engaged against the annulus defined between the outer and the core diameter of said grooved pin wherein the extending legs each further comprise a reduced wall thickness dimension between said transition dimension and said base; and (E) a guard clip, said guard clip including a septum portion operable to extend from said gate dimension into said entry section.

9. A resilient coupling as in claim 8 wherein said guard clip includes arms resiliently engagable around the outer surfaces of said extending legs and distal ends operably engaged with undercuts on the outer surfaces of said legs proximate said reduced wall thickness.

10. A resilient coupling as in claim 8 wherein said guard clip further comprises arms resiliently engageable around the outer surfaces of said extending legs and said outer surfaces are configured with saw-teeth projections operable for engagement with corresponding saw-teeth projections on the inner surfaces of the resilient arms of said guard clip.

11. A resilient coupling as in claim 10 wherein said septum portion further includes a shoulder dimension operable for resilient engagement within and below said first opposing projections proximate the distal ends of said legs.

12. A resilient coupling device in combination with a grooved clevis pin and the like, wherein said grooved pin comprises an outer diameter and a core diameter defined by said groove, further comprising:

(A) a resilient member having a base and two extending legs, wherein the inner surfaces of said base and said legs define a partial circular clamping section for resiliently engaging partially around a core diameter of a grooved clevis pin and the like, wherein, (B) said legs further define an entry section also operable to resiliently engage said core diameter against dislodgement from between said legs, said entry section being defined by first opposing projections, between and proximate the distal ends of said legs to thereby define a gate dimension; and, (C) second opposing projections on said inner surfaces of said legs to define a transition dimension between said entry and clamping sections; both of said dimensions being less than said core diameter so as to resiliently maintain said core diameter against dislodgement; wherein, (D) said base and said two extending legs define an annular bearing surface engaged against the annulus defined between the outer and the core diameter of said grooved pin; and (E) a guard means comprising a member extending inwardly from said gate dimension between said legs and operable to prevent dislodgement of said core diameter from said clamping section.

13. A combination as in claim 12 wherein said guard means further comprises a guard clip, said guard clip comprising a septum member extending inwardly from said gate dimension and contacting the upper surface of the core diameter of said pin.

14. A combination as in claim 12 wherein the base of said coupling further includes an external mounting hole defined by an included opening symmetrically placed on said device and located within said base between said clamping section and the bottom surface of said base.

15. A combination as in claim 14, said guard means comprised by the free end of a knotted rope-like member inserted through said mounting hole, thereafter wrapped once around one of said extending legs then wrapped around the second extending leg and inserted between the core diameter of said pin and the portion of the rope-like member crossing between the extending legs.

16. A combination as in claim 14 wherein two of said coupling devices are clamped on said core diameter, with their respective gate dimension diametrically opposed.

17. A combination as in claim 16, said guard means comprised by the knotted end of a knotted ropelike member positioned in the entry section on a first retainer, thereafter the free end of said rope is extended within the adjacent mounting hole of the second retainer, around the outer diameter of said pin, through the gate dimension of said second retainer, and through the adjacent mounting hole of said first retainer, whereby the position of the knotted end prevents relative rotation of said retainers.

18. A combination as in claim 13 wherein said septum member includes a shoulder dimension inward and resiliently engaged by said first projections on said extending legs.